Feb. 13, 1934.  O. U. ZERK  1,947,146
SHACKLE MECHANISM
Filed April 12, 1932
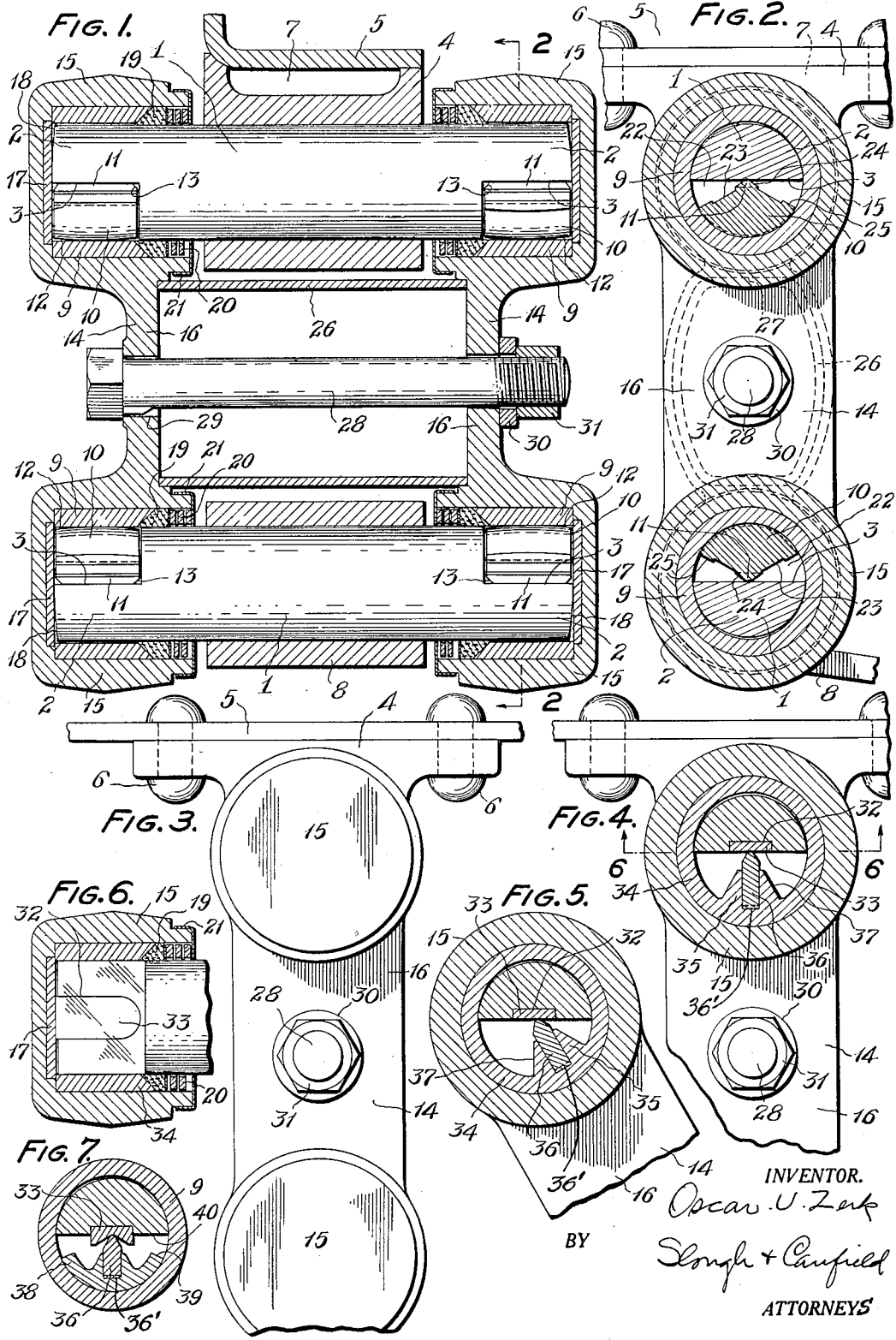
INVENTOR.
Oscar U. Zerk
BY
Slough & Canfield
ATTORNEYS Patented Feb. 13, 1934

1,947,146

UNITED STATES PATENT OFFICE 1,947,146

SHACKLE MECHANISM

Oscar U. Zerk, Cleveland, Ohio

Application April 12, 1932. Serial No. 604,776

50 Claims. (Cl. 267—54)

My invention relates generally to shackles, hangers and like devices in which an oscillatory or like motion is desired between a vehicle or the like, and the means by which it is supported, and relates particularly to an improved relatively non-frictional bearing mechanism permitting this relative oscillating movement.

A principal object of my present invention is to provide an improved shackle, hanger and the like, wherein relative movements of an object and its supporting means may be accomplished without the introduction of objectional friction between the relatively movable parts, even though little or no lubricant is applied to the bearing surfaces of said parts.

Another object of my invention is to provide an improved shackle, hanger or the like, which may be effectively sealed against the ingress of foreign substances to the bearing surfaces.

Another object of my invention is to provide an improved shackle, hanger or the like, wherein objectional lateral movement of the related parts is effectively prevented in a simple inexpensive manner.

Another object of my invention is to provide an improved shackle, hanger or the like, wherein a limited relatively universal movement may be effected between the object to be supported and the supporting means.

Another object of my invention is to provide an improved shackle, hanger or the like mechanism, wherein a relatively non-frictional knife edge type bearing is disposed externally of the spring or hanger.

Another object of my invention is to provide an improved shackle or hanger mechanism employing knife edge bearings, wherein self-sealing packing means prevents the entry of foreign substances to the bearing surfaces.

Another object of my invention is to provide an improved shackle or hanger mechanism employing a knife edge type bearing, disposed externally of the shackle or hanger mechanism, adaptable for highly efficient non-frictional operation, wherein the various parts are effectively maintained in the proper relative positions in a very effective inexpensive manner.

Another object of my invention is to provide an improved shackle or hanger mechanism employing knife edge type bearings, wherein the bearing elements are composed of hardened rustless or stainless chromium steel.

Another object of my invention is to provide an improved shackle or hanger mechanism employing knife edge bearings disposed externally of the said mechanism, wherein the knife edge bearing elements will be movable with the shackle or hanger under normal operating conditions, and be relatively movable thereto under unusual operating conditions.

Another object of my invention is to provide an improved shackle or hanger mechanism of the above type employing relatively inexpensive parts which may be easily and efficiently assembled.

Other objects of my invention and the invention itself will become more apparent to those skilled in the art to which my invention appertains by reference to the following description of certain embodiments of my invention which are illustrated in the accompanying drawing, wherein:

Referring to the drawing—Fig. 1 is a vertical, medial, sectional view of a spring shackle embodying my invention, wherein the upper shackle bolt is secured to a vehicle frame and a lower shackle bolt is secured to a spring eye;

Fig. 2 is a transverse vertical sectional view taken along the lines 2—2 of Fig. 1, and illustrating the structure of the knife edge bearing;

Fig. 3 is a side elevational view of the shackle illustrated in Figs. 1 and 2;

Fig. 4 is a fragmentary, transverse, vertical sectional view of a modification of my invention wherein a knife edge bearing element and the contacting elements are composed of hardened steel inserts;

Fig. 5 is a fragmentary view of the modification illustrated in Fig. 4 after the knife edge element has been rotated angularly to a position inclined to the vertical;

Fig. 6 is a horizontal, sectional view along the lines 6—6 of Fig. 4 showing the shape of the hardened steel bearing inserts; and Fig. 7 is a transverse, vertical sectional view of another modification of my invention wherein I employ a movable sector with a hardened knife insert.

Referring to the drawing—the shackle bolt 1 comprises a cylindrical central portion and similarly disposed semi-cylindrical ends 2 providing plane surfaces 3—3; the ends being hardened to provide hardened bearing surface 3 against which a knife edge element is pressed. The upper shackle bolt 1 is centrally positioned within a bracket 4 preferably by a drive or pressed fit to ensure sufficient friction therebetween to prevent relative lateral movement when transmitting stresses due to side sway of the vehicle or when turning.

The bracket 4 is generally U-shaped and is provided with laterally extending flanges at the upper end of the U leg by means of which the bracket is secured to the sill frame 5 of a vehicle, preferably by riveting as indicated at 6. The bracket 4 is preferably dished intermediate the flanges as indicated at 7, thereby obviating the necessity of machining a relatively large surface to ensure an accurate contacting surface between sill 5 and bracket 5. The lower shackle bolt 1 is centrally positioned in an eye 8 of the vehicle spring and in such manner as to prevent relative lateral movement therebetween, this being accomplished preferably by a drive fit.

Bushings 9 provided with frusto-conical shaped inner faces are disposed over the semi-cylindrical ends 2 of the shackle bolt, and a knife edge sector 10 is disposed intermediate the plane surface 3 of the semi-cylindrical ends and the inner wall of bushing 9. The knife edge sector 10 is adapted to rockingly contact surface 3 along the knife edge portion 11 and seats against bushing 9 along a curved longitudinally extending surface portion 12 whereby a limited rocking action longitudinally of the bushing is permitted.

It will thus be observed that the sector 10 is adapted to rock to a limited extent longitudinally of the bushing 9 and in normal position will seat upon the inner wall of bushing 9 at substantially the mid point of the curved surface portion 12. It will be noted that as the sector is rocked longitudinally of bushing 9 that provision must be made to accommodate a relative lateral movement and accordingly a slight clearance is provided at either end of the sector 10. The ends of the sector are preferably chamfered as indicated at 13.

The bearing and associated parts are housed in a shackle link 14 which comprises cup shaped inwardly disposed ends 15 joined by a generally rectangular intermediate portion 16. The cup ends 15 provided at the bottom thereof with a circular recess within which is secured a circular hardened steel bearing insert 17. This insert provides a surface to take the lateral or end thrust exerted by the shackle bolt 1 and against which the curved end portions 18 of shackle bolt 1 will rock when there is a slight relative rotative action between the bolt and bushing 9.

It is to be observed, that sufficient clearance is provided between the semi-cylindrical bolt end and the interior wall of the bushing to accommodate this relative rotative action.

An annular packing ring 19 formed of a suitable material encircles the shackle bolt 1 with a conforming face thereof seating against the frusto conical shaped face of bushing 9, against which it is held in spring pressed relation by the normally compressed spring 20.

The outer end convolutions of spring 20 engage a preferably sheet metal cup shaped member 21, which is provided with a central aperture whereby it is disposed over the shackle bolt and is secured to the shackle cup end 15 by press-fitting the sheet metal cup 21 over a reduced annular shoulder provided therefor at the inner face of shackle end 15. It will thus be observed that the entire bearing assembly comprising the substantially semicylindrical end of the shackle bolt, the knife edge sector the end thrust bearing plate, the packing ring and the packing spring are housed within the cup shaped end of the shackle link.

The knife edge sector and the bolt being preferably composed of stainless or rustless chromium steel, suitably hardened and adapted to have a relative rocking action axially, will have a negligible abrasive action therebetween. The spring pressed packing ring 19 prevents the entry of grit or other foreign substances to the bearing and this coupled with the fact that there is no tendency towards rust formation ensures that there will be a clean, even contact along the knife edge 11 of the sector and the bearing surface 3 of the bolt and further minimizes any abrasive action.

It will be observed that chambers 22 of variable volume dependent on the position of the sector relative to bearing surface 3 are formed on either side of the sector faces and the bolt bearing surface 3.

Although I contemplate that a shackle of this construction will not require lubrication and the chambers 22 are formed primarily to accommodate the movement of the sector 10, they may be utilized as lubricant chambers if it is desired to lubricate the bearings.

The knife edge sector 10 is preferably undercut longitudinally along the face thereof as indicated at 23, thereby leaving the longitudinal ridge portions 24 and 25. The angle between ridge portion 25 adjacent the arcuate portion of the sector and the vertical axis of the sector is preferably greater than the angle between ridge portion 24 which forms a face of the knife edge and the said axis. Although the ridge of the sector 10 is spoken of as the knife edge I prefer that it be slightly rounded in order to lengthen the wearing qualities of the bearing and this may cause a very slight displacement of the knife edge laterally of the bolt axis which might cause a tendency to bind, if the ridge 24 were permitted to abut bearing surface 3 of the pin. By having the angle between the vertical axis of the sector and ridge 25 relatively greater than that between the axis and ridge 24, this will be prevented and any binding tendency will be eliminated.

The inner face of the intermediate portion 16 of the shackle link 14 is provided with generally oval shaped successively enlarged recesses 24 and 25, the recess 24 being adapted to embrace the ends of an oval shaped spacing collar 26, preferably formed of sheet metal and with the ends secured together by butt-welding as indicated at 27. The shackle links and associated parts are held in substantially parallel relation the ends of the spacing collar abutting the inner face of recess 24 by a bolt 28 which is disposed in aligned generally centrally positioned apertures provided therefor in the shackle link 14.

The bolt 28 is preferably provided with an integrally formed key portion adjacent the head which engages a keyway 29 thereby preventing a relative rotative motion of the bolt. A lock washer 30 and a nut 31 ensures that the shackle links will be held in rigid engagement with the spacing collar 26. By having the bolt 28 keyed to one of the shackle links, the shackle may be adjusted by merely rotating nut 21 and eliminates the necessity of concurrently engaging both head and nut to prevent rotation thereof which may be in an inaccessible position and also permits the use of both hands in adjusting the nut 31 on the bolt.

The spring which is supported by the car axle will therefore support its proportionate share of the sprung weight of the car through the intermediately disposed shackle. It will be observed that there will always be a downward thrust on knife edge 11 of the upper knife edge sector due to the weight of the car and an upward thrust against the lower knife edge sector due to the reaction of the spring, thus the shackle link will always be under pressure, ensuring that the knife edges 11 will always be in engagement with the bolt end bearing surfaces 3.

In an underslung type of suspension wherein the spring is secured to the upper shackle bolt and a lower shackle bolt is secured to the car body, the links would obviously be under tension and consequently the knife edge sectors and the bearing surfaces 3 would be relatively interchanged to ensure bearing engagement therebetween. As the shackle links are rocked relative to the bolt ends 2 the sectors 10 will rock with the shackle and bushing 9 due to the friction therebetween until it contacts surface 3 of the bolt through the longitudinal ridge 25, whereupon the rocking action of the shackle will be retarded but not entirely checked as the sector will be moved relative to the bushing 9 when this rocking force is in excess of the frictional force therebetween.

This construction therefore permits of free movement of the sector 10 with the shackle under normal operating conditions and exerts a stopping or retarding effect under unusual conditions and yet permits of an increased arc of rotation of the shackle about the bolt axis. Upon rocking to the alternate position to contact surface 3 at the opposite side of the bolt axis the sector will be moved towards its normal position, and during normal operation the forces are such as to maintain it in a normal position or to bring it to a normal position relative to bushing 9 if it has been moved therefrom due to contact of bearing surface 3.

In the modification of my invention shown in Figs. 4, 5, and 6, both the knife edge element and a bearing surface against which it contacts are composed of stainless or rustless or chromium steel inserted in a relatively softer and less expensive steel of the bushing and the bolt end. The knife edge element in this modification is not adapted to move relatively angularly of the bushing but is movable therewith rockingly in a longitudinal direction. The bolt end is provided with a recess 32, preferably rectangular in cross section and rounded at the end thereof as illustrated at Fig. 6, within which is inserted the hardened steel insert 33. The bushing 34 is tightly secured within the cup shaped end of the shackle link 15 preferably by press-fitting as previously described. The inner wall of the bushing comprises an arcuate portion and a sector portion 35 forming substantially one-fourth of the wall, the sector portion 35 being provided with a centrally disposed longitudinal slot within which the knife edge element 36 is rockingly positioned. The knife edge element 36 is generally rectangular in cross section other than the V-shaped knife edge portion.

The edge upon which the knife edge element 36 seats in the recess 35 of the sector, that is to say, the edge opposite the knife edge, is slightly curved longitudinally whereby a limited longitudinal rocking motion relative to the bushing is permitted. This curve is illustrated in the drawing by the dotted line 36'; and a side elevational view of this edge would appear like the curved edge 12 of the sector 10 in Fig. 1. For this reason, further illustration thereof in respect to Figs. 4, 5 and 7 is deemed unnecessary. It will be observed that in this modification the knife edge element is movable radially relative to the bearing insert 33 but not as to bushing 34, and therefore the limit of motion between the bushing and the bolt end is determined by the angle between bearing insert 33 in the bolt end, and the angle between the ridge faces of sector 35. The included angle between the ridge faces 37 of the sector is preferably greater than the included angle between the knife edge faces in order to prevent any tendency to bind as hereinbefore described.

Fig. 5 illustrates the relative position of the bolt and the knife edge elements when the shackle link, the bushing and the knife elements have been moved angularly to an inclined position with the vertical. It will be observed as previously stated that the limited motion is controlled by the contact of the sector ridge face 37 with the bolt end and a normal angle therebetween made sufficiently great to prevent contact therebetween except under very unusual operating conditions, whereby a snubbing action would be exerted.

In the modification of my invention as shown in Fig. 7, I employ a hardened steel bearing insert 33 in the bolt end as previously described, in combination with a knife edge bearing element 36 inserted in a movable sector 38, all being housed by the previously described bushing 9. The cross section of the sector is clearly indicated in Fig. 7 and the sector extends longitudinally substantially the length of bushing 9.

As previously described the sector 38 will move with the bushing under normal operating conditions due to the friction therebetween and if exceptional conditions are encountered, the ridge face 39 of the sector will contact the face 40 of the bolt thereby not definitely stopping the movement of the shackle but retarding the same.

This modification combines the advantages of utilizing a sector which is movable relative both to the pin and the bushing and is adapted to use rustless or stainless steel chromium inserts.

Although I have shown and described modifications of my invention I contemplate various other modifications wherein numerous and extensive departures may be made from the embodiments herein illustrated and described, without departing from the scope and spirit of my invention. Having thus described my invention what I claim is:—

1. In a shackle bearing construction, a pair of spaced parallel links having at their ends opposite confronting recesses, a cylindrical shackle pin adapted to be press-fitted into the eye of a hanger or the eye of a spring, its ends projected into the recesses and having coaxial bearing surfaces wholly within the recesses, a sector-form knife edge bearing element in each recess having a substantially knife edge rockingly engaging the bearing surface and having a generally cylindrical surface opposite the edge engaging the inner wall of the recess.

2. The spring shackle construction substantially as described in claim 1, characterized by the opposite ends of the shackle pin having end thrust bearing upon the bottom of the recess on portions adjacent the pin axis.

3. The spring shackle construction substantially as described in claim 1, characterized by the pin ends being rounded and hardened and engaging hardened plates disposed in the bottom of the recesses.

4. The shackle construction substantially as described in claim 1, characterized by the pair of knife edges being substantially coaxially disposed.

5. The shackle construction substantially as described in claim 1, characterized by the link recesses being lined with bushings secured therein, and the sector-form knife edge bearing elements engaging the inner wall of the bushings, and the open ends of the recesses being sealed by annular packing elements engaging the ends of the bushings and the cylindrical end portions of the pins.

6. The shackle construction substantially as described in claim 1, characterized by providing two shackle pins, two sets of recesses with associated parts which are disposed at opposite ends of the shackle links, one pin being press-fitted into the eye of a hanger and the other into the eye of a spring.

7. The shackle bearing construction substantially as described in claim 1, characterized by the engagement of the cylindrical surfaces of the knife edge bearing elements with the wall of the recess being upon longitudinally curved portions thereby insuring self-sealing equalized line contact between the knife edges and the bearing surfaces.

8. The shackle bearing construction substantially as set forth in claim 1, characterized by the knife edge bearing elements being constrained against longitudinal shifting by longitudinally engaging at one end thereof the recess bottom and at the other longitudinal end a shoulder on the pin.

9. In a shackle bearing construction, a pair of spaced parallel links having at their ends opposite confronting recesses, a cylindrical shackle pin adapted to be press-fitted into the eye of a hanger or the eye of a spring, its ends projected into the recesses and having coaxial bearing surfaces wholly within the recesses, and the opposite ends of the said pin having end thrust bearing upon the bottom of the recesses of portions adjacent the axis of the pin, the said pin ends being rounded and hardened to engage hardened plates disposed in the bottom of the recesses, bushings secured within the said recesses, a sector-form knife edge bearing element in each recess having a substantially knife edge rockingly engaging the bearing surface and having a generally cylindrical surface opposite the edge engaging the inner wall of the bushing, the open ends of the recesses being sealed by annular packing elements engaging the ends of the bushings and the cylindrical end portions of the pin, sheet metal elements secured to the open ends of the recesses, and springs abutting the said packing elements and the sheet metal elements to resiliently constrain and compressively seal said packing elements thereon.

10. A shackle bearing construction substantially as set forth in claim 1 and in which the engagement of the knife edge bearing elements with the wall of the recess is upon longitudinally curved portions on the bearing elements and upon substantially cylindrical portions of the recess wall.

11. A shackle bearing construction substantially as set forth in claim 1 and in which, upon extreme rocking movements of the knife edge bearing elements upon the pin bearing surface, the knife edge bearing elements may move upon the recess wall, rotatively about the axis of the knife edge.

12. A shackle construction substantially as set forth in claim 1 and in which the recesses are cylindrical and the knife edge bearing elements engage their corresponding bearing surfaces on a line coaxial with the cylinder.

13. In a shackle bearing construction, a pair of spaced parallel links having at their ends opposite confronting recesses, a cylindrical shackle pin adapted to be press-fitted into the eye of a hanger or the eye of a spring, its ends projected into the recesses and having coaxial bearing surfaces wholly within the recesses, a generally sector-form knife edge bearing element in the recesses and comprising a substantially knife edge portion rockingly engaging the bearing surface and a generally cylindrical surface portion opposite the edge engaging the inner wall of the recess, the knife edge portion being of hardened metal and inserted in a longitudinal groove of the generally cylindrical portion.

14. In a shackle bearing construction substantially as set forth in claim 13, and in which the knife edge portion engages the bottom of the groove of the generally cylindrical portion upon curved surface portions, thereby insuring self-sealing equalized line contact between the knife edges and the bearing surfaces.

15. In a shackle bearing construction substantially as set forth in claim 13, and in which the knife edge rockingly engages a hardened metal insert portion of the said bearing surface of the pin.

16. In a shackle bearing construction, a pair of spaced parallel links having at their ends opposite confronting recesses, a cylindrical shackle pin adapted to be press-fitted into the eye of a hanger or the eye of a spring, its ends projected into the recesses and having coaxial bearing surfaces wholly within the recesses, the recesses being lined with coaxial bushings, a substantially knife edge bearing element within each bushing, the edge rockingly engaging the bearing surface and supported in a longitudinal groove provided upon the inner wall of the bushing.

17. A shackle bearing construction substantially as set forth in claim 16 and in which the knife edge element is supported in the bushing groove to permit relative longitudinal rocking movement of the knife edge element and the bushing.

18. In a shackle mechanism, the combination with a pair of tubular elements to be shackled thereby, a shackle pin projected through each of the tubular elements and being relatively spaced and parallel and each projecting beyond the ends of its associated shackled element, parallel shackle links having opposed inturned cup shaped recesses receiving the ends of said pins and rocking bearing means for each of said pin ends within different of said recess, said pin ends being each cut away to receive its associated rocking bearing means, the cut away portions of each pin being in opposed relation to the cut away portions of the other pin.

19. In a shackle mechanism, the combination with a pair of tubular elements to be shackled thereby, a shackle pin projected through each of the tubular elements and being relatively spaced and parallel and each projecting beyond the ends of its associated shackled element, parallel shackle links having opposed inturned cup shaped recesses receiving the ends of said pins and rocking bearing means for each of said pin ends within different of said recesses, said pin ends being each cut away to receive its associated rocking bearing means, the cut away portions of each pin being in opposed relation to the cut away portions of the other pin, said rocking bearing means each comprising a surface of said pin formed by the said cutting and a longitudinally extending edge of a rocking bearing element interposed between said surface and a wall of its associated said recess.

20. In a shackle mechanism, the combination with a pair of tubular elements to be shackled thereby, a shackle pin projected through each of the tubular elements and being relatively spaced and parallel and each projecting beyond the ends of its associated shackled element, parallel shackle links having opposed inturned cup shaped recesses receiving the ends of said pins and rocking bearing means for each of said pin ends within different of said recesses, said pin ends being each cut away to receive its associated rocking bearing means, the cut away portions of each pin being in opposed relation to the cut away portions of the other pin, and packing means surrounding each end portion of each pin inwardly of its cut away portion and sealing said pin to the walls of the recess towards its mouth.

21. In a shackle mechanism, the combination with a pair of tubular elements to be shackled thereby, a shackle pin projected through each of the tubular elements and being relatively spaced and parallel and each projecting beyond the ends of its associated shackled element, parallel shackle links having opposed inturned cup shaped recesses receiving the ends of said pins and rocking bearing means for each of said pin ends within different of said recesses, said pin ends being each cut away to receive its associated rocking bearing means, the cut away portions of each pin being in opposed relation to the cut away portions of the other pin, and spacing clamping means for said links comprising a bolt and tube, said bolt drawing the intermediate portions of the links against the ends of the tube.

22. In a shackle bearing construction, a pair of spaced links having at their ends opposite confronting recesses, a shackle pin adapted to be press-fitted into the eye of a hanger or the eye of a spring, its ends projected into the recesses and having bearing surfaces thereon wholly within the recesses, a substantially knife edge bearing element within each recess rockingly engaging the pin bearing surface and supported in load-transmitting relation to the recess wall.

23. A shackle bearing construction as described in claim 22 and in which the recess is lined with a bushing and the knife edge element engages the inner wall of the bushing in load-transmitting relation upon mutually engaged cylindrical surfaces thereof opposite the knife edge bearing.

24. A shackle bearing construction as described in claim 22 and in which the pin is sealed at its entrance to the recess.

25. In a shackle bearing construction, a pair of spaced links having at their ends opposite confronting recesses, a cylindrical shackle pin adapted to be press-fitted into the eye of a hanger or the eye of a spring, its ends projected into the recesses and having bearing surfaces thereon wholly within the recesses, the recesses being lined with bushings, a substantially knife edge bearing element within each bushing, the edge rockingly engaging the bearing surface and supported in a load-transmitting relation with the inner wall of the bushing, and sealing means sealing the end of the pin at its entrance to the recess and the outer end of the bushing.

26. In a shackle bearing construction, a pair of links having at their ends opposite confronting recesses, a shackle pin adapted to be press-fitted into the eye of a hanger or the eye of a spring and its ends projected into the recesses, and a knife edge bearing in each recess comprising a substantially knife edge bearing element rockingly engaging a corresponding bearing surface on the pin wholly within the recess and supported in load-transmitting relation with the corresponding shackle link.

27. In a shackle bearing construction, a pair of links having at their ends opposite confronting recesses, a shackle pin adapted to be press-fitted into the eye of a hanger or the eye of a spring and its ends projected into the recesses, and a knife edge bearing in each recess comprising a substantially knife edge bearing element rockingly engaging a corresponding bearing surface on the pin wholly within the recess and supported in load-transmitting relation with the corresponding shackle link, and the open end of the recess being sealed upon the pin at its point of entrance thereinto.

28. In a shackle bearing construction, a pair of links having at their ends opposite confronting recesses, a shackle pin engageable with the eye of a hanger or the eye of a spring and its ends projected into the recesses, and a knife edge bearing in each recess comprising a substantially knife edge bearing element rockingly engaging a corresponding bearing surface on the pin within the recess, and supported in load-transmitting relation with the corresponding shackle link.

29. In a shackle bearing construction, a link having a recess, a shackle pin adapted to engage the eye of a hanger or the eye of a spring and its end projected into the recess, and a knife edge bearing in the recess comprising a substantially knife edge bearing element rockingly engaging a corresponding bearing surface on the pin within the recess, and supported in load-transmitting relation with the corresponding shackle link.

30. In a shackle bearing construction, a pair of links, a transversely disposed pin element having an intermediate portion between the links for securing it to a hanger or to a spring, and laterally and longitudinally rocking knife edge bearings between the links and pin end portions.

31. In a shackle bearing construction, a pair of links having opposite bearing housings therein, a transversely disposed pin element having a portion intermediate the housings for securing it to a hanger or a spring and having opposite end portions extending into the housing and provided with coaxial bearing surfaces therein, a knife edge bearing element having substantially a knife edge rockingly engaging each bearing surface substantially at the bearing axis and arranged to transmit load through the pin end portion, knife edge element, and housing wall.

32. A shackle bearing construction as described in claim 31 and in which the knife edge element is generally of sector form in cross-section and has a portion opposite its knife edge engaging the inner wall of the housing.

33. In a shackle bearing construction as described in claim 31 and in which the housing is lined with a bushing and the knife edge element is generally of sector-form in cross-section and has a portion opposite its knife edge engaging the inner wall of the bushing.

34. A shackle bearing construction as described in claim 31 and in which the knife edge element is generally of sector form in cross-section and has a portion opposite its knife edge engaging the inner wall of the housing and formed to rock longitudinally thereon to insure engagement of the knife edge with a bearing surface throughout the length of the knife edge.

35. A shackle bearing construction as described in claim 31 and in which the knife edge element is supported on a wall of the housing.

36. A shackle bearing construction as described in claim 31 and in which the knife edge element is mounted in a groove formed on the wall of the bushing.

37. A shackle bearing construction as described in claim 31 and in which the knife edge element is mounted in a groove formed in the wall of the housing and is formed to rock longitudinally on the groove bottom to insure engagement of the knife edge with a bearing surface throughout the length of the knife edge.

38. A shackle bearing construction as described in claim 31 and in which the knife edge element is supported on a wall of the housing and the surface of the pin end portion is on a separate hardened element secured to the pin end.

39. A shackle bearing construction as described in claim 31 and in which the knife edge element is generally of sector form in cross-section and has a portion opposite its knife edge engaging the inner wall of the housing and the bearing surface of the pin end portion is on a separate hardened element secured to the pin end.

40. A shackle bearing construction as described in claim 31 and in which the knife edge element comprises a body portion generally of sector form in cross-section engaging the inner wall of the housing and the knife edge is on a separate hardened element mounted thereon.

41. A shackle bearing construction as described in claim 31 and in which the knife edge element comprises a body portion generally of sector form in cross-section engaging the inner wall of the housing and the knife edge is on a separate hardened element mounted thereon and the bearing surface on the pin end is on a separate hardened element secured thereto.

42. A shackle bearing construction as described in claim 31 and in which the knife edge element comprises a body portion generally of sector form in cross-section engaging the inner wall of the housing and the knife edge is on a separate hardened element mounted in a groove in the body portion.

43. A shackle bearing construction as described in claim 31 and in which the knife edge element comprises a body portion generally of sector form in cross-section engaging the inner wall of the housing and the knife edge is on a separate hardened element mounted in a groove in the body portion and formed to rock longitudinally on the bottom of the groove to insure engagement of the knife edge with a bearing surface throughout the links of the knife edge.

44. A shackle bearing construction as described in claim 31 and in which the bearing surface of the pin end portion is at the bottom of a V-shaped groove.

45. A shackle bearing construction as described in claim 31 and in which the bearing surface of the pin end portion is at the bottom of a V-shaped groove formed on a separate hardened element secured to the pin end.

46. A shackle bearing construction as described in claim 31 and in which the pin element is provided with cylindrical portions adjacent the housings and sealing means is provided to seal the cylindrical portions on the housings.

47. A shackle bearing construction as described in claim 31 and in which the housings have end walls to close the same.

48. A shackle bearing construction as described in claim 31 and in which the housings have end walls to close the same and the pin end portions engage the end walls at substantially coaxial portions thereof.

49. In a shackle bearing construction as described in claim 31 and in which the housings have end walls and the pin end portions have shoulder portions axially spaced therefrom and the knife edge elements are disposed between the housing ends and the shoulders.

50. A shackle bearing construction as described in claim 31 and in which the housings have end walls and the pin end portions have shoulder portions axially spaced therefrom and the knife edge elements are disposed between the housing ends and the shoulders and lubricant passageways are provided at axial ends of the knife edge elements to permit free passage of lubricant from one side to the other of the knife edge elements upon rocking movment thereof.

OSCAR U. ZERK.